United States Patent
Bhatnager

(10) Patent No.: US 9,071,682 B2
(45) Date of Patent: Jun. 30, 2015

(54) METHODS AND DEVICE FOR PROVIDING DYNAMIC COMMUNICATION OPTIONS

(75) Inventor: Prateek Bhatnager, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/583,049

(22) PCT Filed: May 12, 2011

(86) PCT No.: PCT/CA2011/050296
§ 371 (c)(1),
(2), (4) Date: Sep. 6, 2012

(87) PCT Pub. No.: WO2012/151658
PCT Pub. Date: Nov. 15, 2012

(65) Prior Publication Data
US 2013/0072148 A1 Mar. 21, 2013

(51) Int. Cl.
H04W 88/06 (2009.01)
H04M 1/2745 (2006.01)
H04W 4/14 (2009.01)
H04L 12/58 (2006.01)

(52) U.S. Cl.
CPC .......... H04M 1/274583 (2013.01); *H04W 4/14* (2013.01); *H04L 51/38* (2013.01); H04L 51/28 (2013.01); H04L 51/36 (2013.01)

(58) Field of Classification Search
USPC ........... 455/405, 414.1–414.4, 406, 418, 466; 709/206, 217
See application file for complete search history.

(56) References Cited

U.S. PATENT DOCUMENTS

| 7,735,021 B2 | 6/2010 | Padawer |
| 8,009,678 B2* | 8/2011 | Brooke .................... 370/395.42 |
| 8,392,836 B1* | 3/2013 | Bau et al. ...................... 715/739 |
| 8,503,989 B2* | 8/2013 | Kasturi et al. ............. 455/414.1 |
| 8,577,007 B2* | 11/2013 | Sherman et al. ......... 379/210.01 |
| 8,583,126 B2* | 11/2013 | Yach ............................ 455/445 |

(Continued)

FOREIGN PATENT DOCUMENTS

| EP | 2096842 | 9/2009 |
| WO | 2010051478 | 5/2010 |

OTHER PUBLICATIONS

Written Opinion and International Search Report dated Feb. 7, 2012.

(Continued)

*Primary Examiner* — Khawar Iqbal
(74) *Attorney, Agent, or Firm* — Rowand LLP

(57) ABSTRACT

A method and device for providing dynamic communication options on a communications device are provided. The communications device is configured to provide communication services using a plurality of communication methods. The method for providing dynamic communication options comprises: monitoring communications with a contact associated with the communications device and obtaining communication method usage information based on the communication methods used for the communications with the contact; ranking communication methods for the contact based on the communication method usage information; and displaying at least two of the communication methods in an ordered list, wherein the respective positions of the displayed communication methods in the list are determined in accordance with the rankings.

15 Claims, 9 Drawing Sheets

(56) References Cited

U.S. PATENT DOCUMENTS

| | | | |
|---|---|---|---|
| 8,620,283 B2* | 12/2013 | Lee et al. ................. | 455/414.1 |
| 2006/0209690 A1 | 9/2006 | Brooke | |
| 2007/0047695 A1* | 3/2007 | Tal et al. .................. | 379/67.1 |
| 2007/0135110 A1* | 6/2007 | Athale et al. ............. | 455/418 |
| 2009/0221268 A1* | 9/2009 | Yach ........................ | 455/414.1 |
| 2010/0267359 A1* | 10/2010 | Gyllensvaan ............. | 455/404.1 |
| 2010/0304766 A1* | 12/2010 | Goyal ...................... | 455/466 |
| 2011/0087744 A1* | 4/2011 | Deluca et al. ............ | 709/206 |
| 2011/0217997 A1* | 9/2011 | Jimenez Aldama et al. .. | 455/466 |
| 2012/0149404 A1* | 6/2012 | Beattie et al. ............ | 455/466 |

OTHER PUBLICATIONS iPhone User Guide p. 39, Available at least as early as Nov. 24, 2010.
Favourites for iPhone, Available at least as early as Nov. 24, 2010.
One Touch, Home Button, Dec. 7, 2010.

* cited by examiner

METHODS AND DEVICE FOR PROVIDING DYNAMIC COMMUNICATION OPTIONS

TECHNICAL FIELD

The present disclosure relates to communication devices and methods and more particularly, to methods and devices for providing dynamic communication options.

BACKGROUND

Communication devices may provide many different methods for communicating with a contact. On some communication devices, different communication technologies may be employed in order to communicate with a contact. For example, a mobile communication device may be equipped to communicate with a contact using electronic mail (e-mail), text messaging, such as short message service messaging (SMS), multimedia messaging service (MMS), instant messaging, a voice-based phone, or facsimile. Other communication technologies and communication methods may also be employed.

Communication devices often include a display which is associated with a graphical user interface (GUI) and one or more input mechanisms for navigating the graphical user interface. The GUI and input mechanisms typically allow a user to initiate a communication with a contact. Where a user of a communication device would like to communicate with a contact, they often navigate the graphical user interface in order to select a particular communication method to be used to communicate with the contact. For example, a user may select a "Call" option to place a voice-based phone call to a telephone number associated with the contact.

The process of navigating the graphical user interface in order to select the desired communication method may be slow and may, as a result, consume system resources such as battery resources, memory resources and display resources.

Thus, there exists a need to provide improved methods, systems and devices for permitting communications with contacts.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

Figure 1:
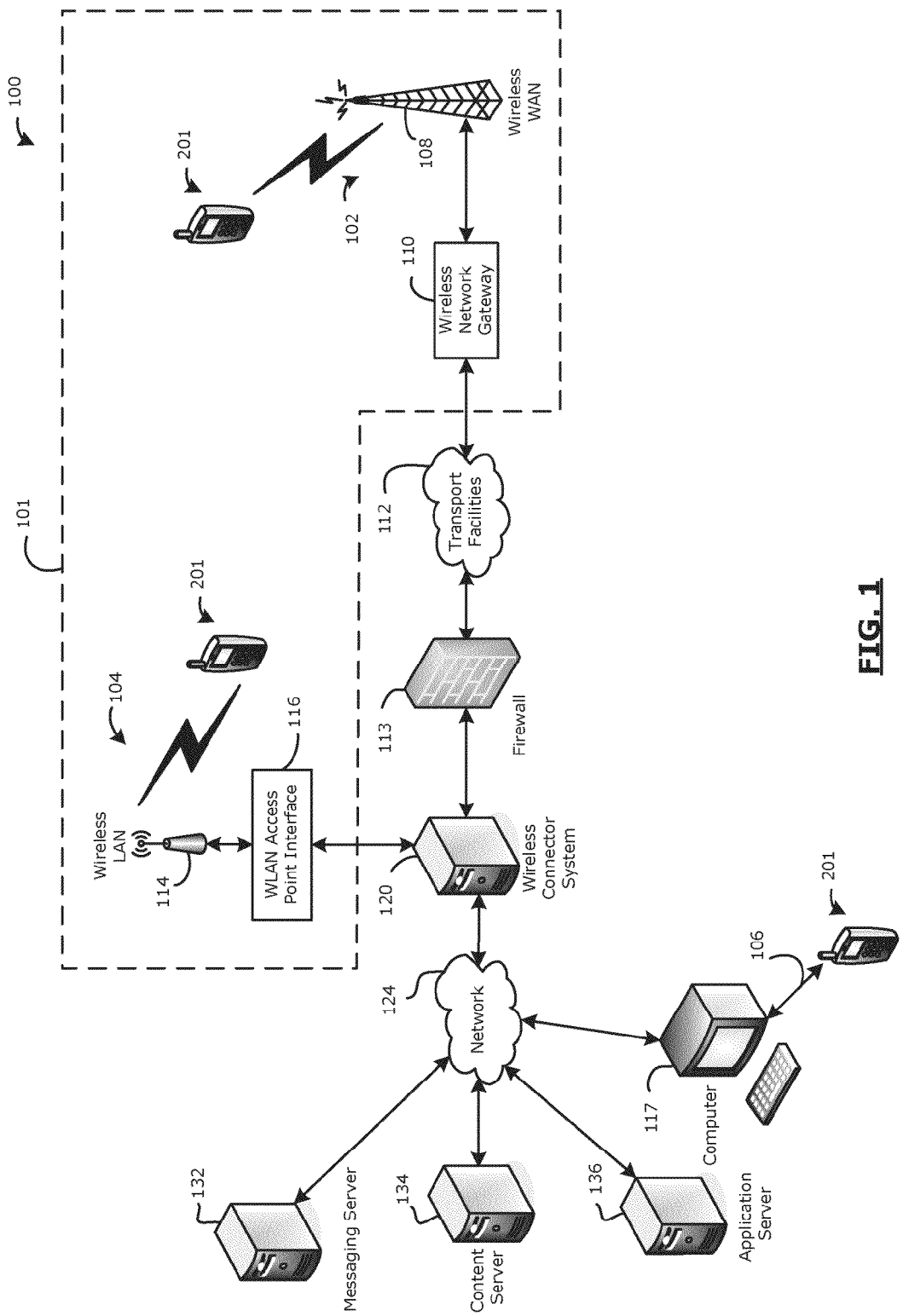
FIG. 1 is a block diagram illustrating a communication system in which example embodiments of the present disclosure can be applied.

The present disclosure describes a method for providing dynamic communication options on a communications device. The communications device is configured to provide communication services using a plurality of communication methods. The method for providing dynamic communication options includes: monitoring communications with a contact associated with the communications device and obtaining communication method usage information based on the communication methods used for the communications with the contact; ranking communication methods for the contact based on the communication method usage information; and displaying at least two of the communication methods in an ordered list, wherein the respective positions of the displayed communication methods in the list are determined in accordance with the rankings.

In another aspect, the present disclosure describes an electronic device. The electronic device includes a communication subsystem for sending communications using a plurality of communication methods. The electronic device also include a processor and a display and a memory, having stored thereon computer readable instructions for causing the processor to: monitor communications with a contact associated with the communications device and obtaining communication method usage information based on the communication methods used for the communications with the contact; rank communication methods for the contact based on the communication method usage information; and display at least two of the communication methods in an ordered list, wherein the respective positions of the displayed communication methods in the list are determined in accordance with the rankings.

In yet a further aspect, the present disclosure describes a method for assigning a command to an input mechanism on a communications device. The communications device is configured to provide communication services using a plurality of communication methods to a plurality of contacts. The method includes: selecting one of the plurality of communication methods as a preferred communication method for communicating with a selected one of the contacts; and for communications to the selected one of the contacts, associating the input mechanism with the preferred communication method.

In yet a further aspect, the present disclosure describes an electronic device. The electronic device includes a communication subsystem for sending communications using a plurality of communication methods. The electronic device also includes a processor, an input mechanism and a memory having stored thereon computer readable instructions for causing the processor to: select one of the plurality of communication methods as a preferred communication method for communicating with a selected one of the contacts; and for communications to the selected one of the contacts, associating the input mechanism with the preferred communication method.

Other example embodiments of the present disclosure will be apparent to those of ordinary skill in the art from a review of the following detailed description in conjunction with the drawings.

Example embodiments of the present disclosure are not limited to any particular operating system, mobile device architecture, server architecture, or computer programming language.

The present disclosure describes, among other things, an electronic device which is configured to provide dynamic communication options.

System Overview

In order to facilitate an understanding of one possible environment in which example embodiments described herein can operate, reference is first made to FIG. 1 which shows, in block diagram form, a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, or application servers 136. Conversely, the wireless connector system 120 sends data packets received, for example, from the messaging server 132, content server 134, or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one example embodiment, the link 106 is a USB connection to the mobile communication device 201. In at least some example embodiments, the link 106 is a Bluetooth™ connection.

The content server 134 is configured to deliver digital content to the host computer 117 upon request by the host computer 117. The content server 134 may, in at least some example embodiments, be a publicly accessible server which hosts digital content. The content server 134 is, in at least some example embodiments, a web server which delivers content using the Hypertext Transfer Protocol (HTTP) or another suitable protocol over the World Wide Web. The content server 134 may host one or more web pages or other digital content. The web pages may, in at least some example embodiments, provide an interface for accessing other digital content. For example, the web pages may include one or more links to other content, such as, for example, audio files, images, video files, etc.

Accordingly, the content server 134 is configured to serve digital content. The digital content may, in various example embodiments, include video files, audio files, documents, podcasts, e-books, web-pages, images such as photographs, icons, themes, applications, and/or games. Other types of digital content are also possible. The digital content may include any information which is published or distributed in a digital form.

The host computer 117 typically includes a controller having at least one processor (i.e., microprocessor) for controlling its operation, a communications subsystem connected to the processor for communicating with the communication system 100, a display screen or monitor connected to the processor, one or more user input devices such as a keyboard and mouse connected to the processor for sending user input signals to the processor in response to user inputs, a memory or storage element connected to the processor such as a hard disk drive (HDD), RAM, ROM and/or other suitable memory connected to the processor, and other suitable input and output devices as desired or required. The memory has data and instructions stored thereon for configuring the processor and host computer 117. Operating system software, software applications, and data used by the processor are stored in the memory. The software and data configure the operation of the host computer 117. Other features of the host computer 117 for implementing the processes and functions described herein will be appreciated by persons ordinarily skilled in the art.

Accordingly, the communication system of FIG. 1 permits devices 201 to communicate with one or more other devices using one or more communication technologies.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Figure 2:
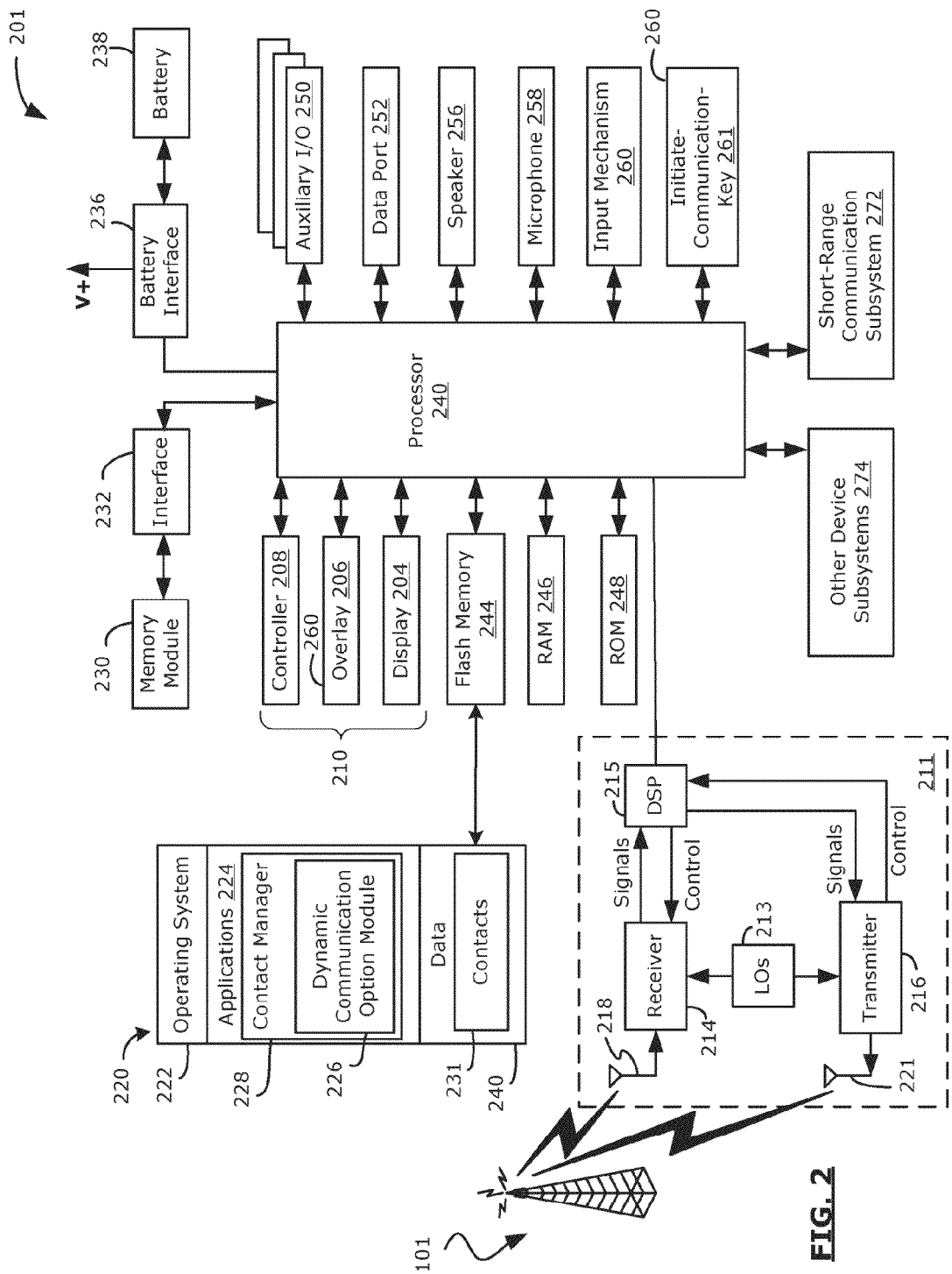
FIG. 2 is a block diagram illustrating a mobile communication device in which example embodiments of the present disclosure can be applied.

Reference is now made to FIG. 2 which illustrates a mobile communication device 201 in which example embodiments described in the present disclosure can be applied. The mobile communication device 201 is a two-way communication device having data and possibly also voice communication capabilities. The mobile communication device 201, in at least some example embodiments, has the capability to communicate with other computer systems; for example, via the Internet. Depending on the functionality provided by the mobile communication device 201, in various example embodiments the mobile communications device 201 may be a data communication device, a multiple-mode communication device configured for both data and voice communication, a smartphone, a mobile telephone or a PDA (personal digital assistant) enabled for wireless communication, or a computer system with a wireless modem. The mobile communications device 201 may also be referred to as a communication device 201, an electronic device 201, a mobile device 201 and, in some cases, as a device 201.

The mobile communication device 201 includes a controller including at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. That is, the communication subsystem 211 is configured to provide communication services using a plurality of communication technologies. For example, the device 201 may be equipped to communicate via any one or combination of: electronic mail (e-mail), text messaging, such as short message service messaging (SMS), multimedia messaging service (MMS), instant messaging, voice-based communications, social network based messaging, Device-to-Device based messaging, or facsimile. Other communication technologies may also be employed.

The processor 240 interacts with additional device subsystems. In some example embodiments, the mobile device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism 260 to provide a touch-sensitive input device. The processor 240 also interacts with the touch-sensitive overlay 206 via the electronic controller 208. In other example embodiments, the display 204 may not be a touchscreen display. Instead, the mobile device 201 may simply include a non-touch display and one or more input mechanisms 260, such as, for example, a depressible scroll wheel or other control keys.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, input mechanism 260, initiate-communication-key 261 (which may be a further input mechanism 260 on the device 201), short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

The processor 240 operates under stored program control and executes software modules 220 stored in memory such as persistent memory; for example, in the flash memory 244. As illustrated in FIG. 2, the software modules 220 include operating system software 222 and software applications 224, such as a contact manager 228.

As will be explained in greater detail below, the contact manager 228 maintains a database used for storing contacts 231 associated with the device 201. The contacts 231 may be associated with individuals and/or businesses, such as persons or businesses associated with one or more users of the device 201. By way of example, each contact 231 includes identifying information, such as, for example, a name associated with the contact 231. For example, a contact 231 may include a name of a person or business. Such information may be used to identify the contact 231.

At least some of the contacts 231 also include address information associated with one or more communication methods. The one or more communication methods are methods which may be employed by the device 201 in order to communicate with the contact 231. For example, the address information may include a home telephone number, a mobile telephone number, a business telephone number, a facsimile telephone number, an electronic mail (email) address, a social network based messaging address (such as, for example, a user name associated with a social network) an instant messaging address, and/or a Personal Identification Number (PIN).

The address information, identifying information or other information for the contacts 231 may be stored in one or more fields of a contact record.

The address information may permit the device 201 to communicate with the contact 231 using multiple communication technologies. For example, the device 201 may be equipped to communicate via any one or combination of: electronic mail (e-mail), text messaging, such as short message service messaging (SMS), social network based messaging, multimedia messaging service (MMS), instant messaging, one or more voice communication technologies, Device-to-Device based messaging, or facsimile. Other communication technologies may also be employed.

Device-to-Device based messaging may include PIN messaging, which is a communication technology for sending data messages, such as text based messages, which relies on a unique personal identification number (PIN) associated with a device to describe the destination of a data message. That is, the PIN is a hardware address. In at least some example embodiments, PIN messaging does not rely on the use of an email server. In such example embodiments, PIN messages do not pass through an email server when they are sent from a source device to a recipient device.

Voice-based communications may, in some example embodiments, include cellular based voice communications (for example, using GSM or CDMA technology or other suitable technologies). In some example embodiments, the voice communications may include Internet based voice communication technologies, such as Voice Over Internet Protocol (VOIP) communications including, for example Skype™. At least some devices 201 may be equipped to communicate using multiple voice communication technologies.

Each type of address information which is associated with a contact 231 may be associated with one or more communication technologies. For example, a home telephone number, mobile telephone number or business telephone number may be associated with voice communications and, in some example embodiments, may also be associated with SMS and/or MMS messaging. Similarly, a facsimile number is associated with a facsimile communication technology. An electronic mail (email) address is associated with email communication technology. An instant messaging address is associated with an instant messaging technology. A PIN may be associated with a PIN messaging technology.

Accordingly, the address information in the contacts provides for communications with the contacts 231 using a variety of communication methods. Each combination of an address and a communication technology which is compatible with that address may represent a distinct communication method. Thus, in at least some example embodiments, a communication method may be defined by address information (such as a specified address associated with the contact) and a communication technology which is compatible with the specified address information (i.e. a communication which may be used to communicate using that communication address). For example, contacting a contact 231 via their mobile telephone number using voice communications may define one possible communication method for a contact. Another possible communication method may be emailing a contact via an email address. Yet a further possible communication method may involve SMS messaging a contact via their mobile telephone number. Accordingly, in at least some example embodiments, communication methods may be defined by address information and communication technology pairs.

The contact manager 228 may, in various example embodiments, be referred to as an address book and/or a phone book. The contact manager 228 acts as a manager of contacts 231 and, in some example embodiments, acts as a front-end for accessing contacts 231 and initiating communications to contacts 231.

The contact manager 228, in at least some example embodiments, includes a dynamic communication option module 226. The dynamic communication option module 226 may be used to provide dynamic communication options on the device 201. More particularly, the dynamic communication option module 226 may be configured to provide options to users of the device 201 allowing such users to initiate a communication with a contact. As will be explained in greater detail below, the dynamic communication option module 226 may allow a user to easily select a desired communication method for communicating with a contact 231.

The contact manager 228, in at least some example embodiments, includes a graphical user interface (GUI) for managing and/or initiating communications which the contacts 231. It at least some example embodiments, the GUI displays a list of communication methods which are available for communicating with a selected contact 231. The list may, for example, be displayed on the display in response to predetermined input being received from the input mechanism 260. For example, in at least some example embodiments, the contact manager 228 allows a user to select one of the contacts 231 using the input mechanism 260. In at least some example embodiments, in response to a predetermined input being received through the input mechanism 260, the contact manager 228 may cause the list to be displayed on the display. The predetermined input may, for example, be a menu key.

The list of communication methods is a selectable list which identifies communication methods which may be used to communicate with the contact 231. For example, in at least some example embodiments, the list is an ordered list which displays at least two of the communication methods available for communicating with the contact 231. The communication methods displayed in the list are selectable using an input mechanism 260 associated with the device 201. That is, in at least some example embodiments, in response to an activation of one of the displayed communication methods using the input mechanism 260, the device 201 initiates communication to the contact using the selected communication method.

As will be described in greater detail below, in at least some example embodiments, in order to permit a desired communication method to be easily selected, the dynamic communication option module 226 is configured to monitor communications with each contact 231 associated with the device 201 and to obtain communication method usage information based on the communication methods used for communications with that contact. That is, the dynamic communication option module 226 is configured to track usage of each communication method for communicating with each contact 231.

In at least some example embodiments, the communication method usage information includes frequencies of success for communicating with a contact using each communication method. In such example embodiments, the dynamic communication option module 226 may be configured to log whether communication attempts using each communication method have been successful for each contact. After a communication attempt has been made to a contact 231 using a given communication method, the dynamic communication option module 226 saves data to memory to indicate that the communication attempt was made and to indicate whether the communication was successful. This data may be used to determine the frequency of successful communications to a given contact 231 using each communication method.

The specific method of determining whether the communication was successful may depend on the communication technology used to communicate with the contact. For example, in at least some example embodiments, where the communication technology is a voice based communication technology, the frequency of success may be determined based on the number of voice calls to a contact which have been completed. That is, the dynamic communication option module 226 may be configured to determine that a communication was successful if the call to the contact 231 was completed.

The call may be completed if the call does not result in a busy signal. That is, if the call results in a busy signal, then the dynamic communication option module 226 may determine that the call was not successful.

In other example embodiments, the dynamic communication option module 226 may determine that a voice call was not successful if the call was received by a voicemail system (and not answered by an individual). In at least some example embodiments, this determination may be made by determining whether the duration of a call exceeds a predetermined threshold. If the duration of the call is less than the predetermined threshold, then the dynamic communication option module 226 may determine that the call was not successful. The threshold may correspond to the length of a typical voice messaging message.

In at least some example embodiments, the dynamic communication option module 226 may determine that a voice call was successful if a return call was received from the number that was called within a predetermined period of time after the call was placed. That is, the dynamic communication option module 226 may determine that a voice call was successful if the call is returned within a predetermined period of time.

A frequency of success for a voice calls to a contact may be determined based on the number of voice calls to a contact which have been successful and the total number of voice call attempts to the contact 231.

In at least some example embodiments, a communication may be determined to be successful if a response from the contact 231 associated with that communication is received. In at least some example embodiments, the dynamic communication option module 226 is configured to determine whether a reply to a communication has been received and to determine that a communication to a contact 231 was not successful if a reply communication from the contact 231 was not received within a predetermined period of time following the communication to the contact 231. If a communication from the contact 231 is received within a predetermined period of time following the communication to the contact 231, then the dynamic communication option module 226 determines that the communication to the contact 231 was successful.

In at least some example embodiments, a communication may be determined to be successful if a read receipt and/or a delivery receipt is received at the device in response to communication being sent from the device. For example, some communication technologies such as instant messaging or email may allow a recipient device to transmit a read receipt or delivery receipt back to a device to advise the device that a message has been read (i.e. displayed on the device) and/or delivered (i.e. received at the device). In such cases, when a device 201 receives a read and/or delivery receipt, it may determine that the communication was successful.

The frequency of success thus acts as a measure of the likelihood of reaching a contact using a communication method. Accordingly, in at least some example embodiments, the dynamic communication option module 226 determines a frequency of success for each communication method associated with a contact in order to determine the likelihood that any given communication method will be successful in contacting a contact 231.

The frequency of success for each communication method is determined on a per-contact basis. That is, the frequency of success for each communication method may vary between contacts 231. The frequency of success for each communication method is separately tracked for each contact 231.

While frequency of success may be used in some example embodiments, in other example embodiments, other communication method usage information may be used. For example, in some example embodiments, the communication method usage information may be based on or identify a number of communication attempts for each communication method used for communications with a contact. That is, the communication method usage information may represent a frequency of use of each communication method for contacting a contact 231. A count of the number of communication attempts to a contact using each communication method may be obtained by the dynamic communication options module 226. That is, each time a communication is made to a contact using a communication method, a counter associated with that communication method and that contact 231 may be incremented. In at least some example embodiments, a frequency of use of each communication method for contacting a contact may then be determined.

In at least some example embodiments, the dynamic communication option module 226 is further configured to rank communication methods for a contact based on the communication method usage information.

Accordingly, in some example embodiments, the dynamic communication option module 226 is configured to rank each communication method available for a contact based on the frequency of success in reaching that contact using that communication method. That is, in at least some example embodiments, ranking communication methods involves assigning a higher relative rank to communication methods with a higher frequency of success than communication methods with a lower relative frequency of success.

In other example embodiments, the dynamic communication option module 226 is configured to rank each communication method available for a contact based on the frequency of use of that communication method for attempting to contact that contact.

By way of example, in at least some example embodiments, a contact 231 is associated with at least three distinct communication methods. In such example embodiments, the three communication methods are ranked relative to one another based on the communication method usage information. In such example embodiments, ranking communication methods includes determining a first highest ranked communication method, a second highest ranked communication method and a third highest ranked communication method.

Each communication method which is available for contacting the contact may, in some example embodiments, be ranked. In some example embodiments, some of the communication methods available for contacting a contact may be filtered out from the ranking. That is, one or more of the communication methods available for contacting a contact may be excluding from the ranking process.

The dynamic communication option module 226 is also configured to, in at least one mode, display the communication methods in an ordered list in which the respective positions of the displayed communication methods are determined in accordance with the rankings. The ordered list, in at least some example embodiments, includes at least three communication methods. The respective position of each communication method in the ordered list is determined in accordance with the rankings. That is, each communication method that is ranked more highly than another communication method in the list is displayed more prominently than the other communication method of lower rank. In at least some example embodiments, higher ranked communication methods are displayed at a position which is higher in the list than communication methods which are of a relatively lower rank.

Where the ordered list includes at least three communication methods, the first highest ranked communication method is displayed in a higher relative position than the second highest ranked communication method and the second highest ranked communication method is displayed in a higher relative position than the third highest ranked communication method.

It will be appreciated that the dynamic communication option module 226 may not immediately display the ordered list on the display. In at least some example embodiments, the dynamic communication option module 226 is only configured to display the ordered list on the display in response to receiving a predetermined input via an input mechanism 260. For example, in at least some example embodiments, the ordered list will be displayed after a contact manager 228 is opened on the device 201. The contact manager 228 may be opened in response to a user of the device 201 selecting an associated icon or link to the contact manager 228 application using a navigational input mechanism 260. After the contact manager 228 is opened on the device 201, the contact manager 228 may cause a list of contacts to be displayed on the device 201. The list may include one or more contacts 231 for which communication methods have been monitored and possibly also ranked.

The contact manager 228 may permit a user to select one of the contacts 231 using a navigational input mechanism 260. In response to receiving a selection of one of the contacts, the contact manager 228 may cause the ordered list for that contact to be displayed. The ordered list for that contact displays communication methods in a manner in which the respective positions of the communication methods corresponds to the rankings of communication methods for that contact 231.

In at least some example embodiments, after the ordered list is displayed, the device 201 may permit a user to select one of the communication methods in the ordered list using an input mechanism 260 associated with the device. In response to receiving such a selection, the contact manager 228 may initiate communications to the contact 231 associated with the ordered list using the selected communication method. In at least some example embodiments, the contact manager 228 may do so by launching an application associated with the communication method. For example, if the selected communication method is an email communication method, then the contact manager 228 may launch an email application.

In at least some example embodiments, the contact manager 228 may automatically populate one or more fields associated with a communication with address information for the selected communication method. For example, the contact manager 228 may automatically populate an address field associated with the communication with address information for the selected communication method.

In some example embodiments, the contact manager 228 and/or the dynamic communication option module 226 may be standalone software applications. In other example embodiments, dynamic communication option module 226, or parts thereof, may be one or more software modules included in another computer program or application. For example, in at least some example embodiments, the dynamic communication option module 226 may be included within the operating system 222 of the device 201.

In some example embodiments, the functions performed by dynamic communication option module 226 may be realized as a plurality of independent elements, rather than a single integrated element, and any one or more of these elements may be implemented as parts of other software applications (such as, for example, the operating system 222).

In some example embodiments, the functions described with reference to the contact manager 228 may be split into multiple applications or modules, each performing a subset of the functions of the contact manager 228.

The software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, an address book application, a messaging application, a calendar application, and/or a notepad application. In some example embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230 (typically including flash memory, such as a removable memory card) and a memory interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various example embodiments, the data 240 includes service data including information required by the mobile communication device 201 to establish and maintain communication with the wireless network 101. The data 240 may also include user application data such as email messages, contacts 231, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contacts 231, and task items may be stored in individual databases within the mobile device memory.

In some example embodiments, the mobile communication device 201 is provided with a service routing API which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable or Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 222 or software applications 224 may also be loaded onto the mobile communication device 201 through the wireless network 101, the auxiliary I/O subsystem 250, the data port 252, the short-range communication subsystem 272, or other suitable subsystem 274 other wireless communication interfaces. The downloaded applications or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and, in some example embodiments, a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile communication device 201 may also compose data items, such as email messages, instant messages, SMS messages, and MMS messages, for example, using the touch-sensitive overlay 206 in conjunction with the display device 204 and possibly other input mechanisms 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

In some example embodiments, the device 201 includes an initiate-communication-key 261. The initiate-communication-key 261 is an input mechanism 260 which is a hardware based key. In at least one mode, the initiate-communication-key 261 is configured to initiate a communication using a communication method to a contact 231.

In at least some example embodiments, each contact may have its own communication method associated with the initiate-communication-key 261. In such example embodiments, when that contact 231 is selected within a contact manager 228, the initiate-communication-key 261 causes a communication to be initiated to the contact 231 using the communication method associated with the initiate-communication-key for that contact.

Accordingly, in at least some example embodiments, the dynamic communication option module 226 is configured to select one of the communication methods as a preferred communication method for communicating with a selected one of the contacts 231. Afterward, when the initiate-communication-key 261 is activated when that contact is selected, the dynamic communication option module 226 will initiate a communication to that contact using the preferred communication method for that contact.

The dynamic communication option module 226 may, in some example embodiments, monitor usage of the communication methods for communicating with the contact and automatically select a preferred communication method for communicating with the selected contact based on the usage of the communication methods. For example, in some example embodiments, the dynamic communication option module 226 determines a most frequently used communication method for communicating with the contact and automatically selects that communication method as the preferred communication method for communicating with that contact. In other example embodiments, the dynamic communication option module 226 determines a most frequently successful communication method for communicating with the contact and automatically selects that communication method as the preferred communication method for communicating with that contact.

In other example embodiments, the preferred communication method for a contact may be selected by way of user input via an input mechanism 260 associated with the device. That is, a user may use an input mechanism 260 to instruct the device 201 to select a specified one of the communication methods as the preferred communication method for communicating with a selected one of the contacts.

For each contact, the dynamic communication option module 226 associates the initiate-communication-key 261 with the preferred communication method for that contact.

In this way, after the preferred communication method is selected for a contact, when the initiate-communication-key is activated (i.e. an input is received at the device 201 from the initiate-communication-key 261) when the contact is selected (i.e. by selecting the contact in the contact manager 228) a communication to that contact will be initiated using the preferred communication method for that contact.

In some example embodiments, a communication to that contact may be initiated by opening an application associated with that communication method. In at least some example embodiments, the contact manager 228 may do so by launching an application associated with the preferred communication method for the selected contact. For example, if the preferred communication method is an email communication method, then the contact manager 228 may open an email application.

In at least some example embodiments, the contact manager 228 may automatically populate one or more fields of a communication with address information for the preferred communication method for the contact. For example, the contact manager 228 may automatically populate an address field associated with the communication with address information for the selected communication method.

Providing a Ranked List of Communication Methods

Figure 3:
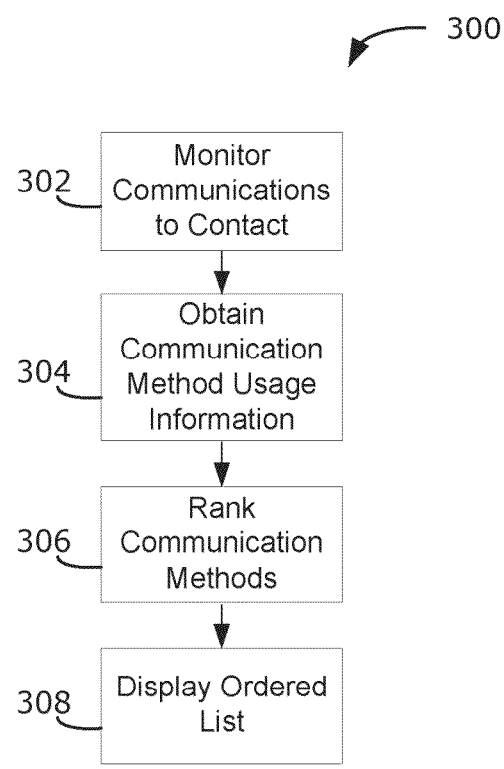
FIG. 3 is a flowchart illustrating a method for providing dynamic communication options on a communication device in accordance with example embodiments of the present disclosure.

Referring now to FIG. 3, a flowchart of a method 300 for providing dynamic communication options on a communication device 201 is illustrated. One or more application or module stored in memory of the device 201 may be configured to perform the method 300 of FIG. 3. More particularly, one or more application or module may contain computer readable instructions which cause the processor 240 (FIG. 2) of the device 201 to perform the method 300. In at least some example embodiments, a contact manager 228 and/or a dynamic communication option module 226 stored in memory of the device 201 is configured to perform the method 300 of FIG. 3. It will, however, be appreciated that any one or more of the steps of FIG. 3 may be provided by another software application or module; for example, the operating system 222.

First, at 302, the dynamic communication option module 226 monitors communications to each contacts 231 associated with the device 201 and, at 304, obtains communication method usage information based on the communication methods used for communications with each contact. The communication method usage information is obtained on a per-contact basis. That is, the communication method usage information is obtained separately for each contact.

In at least some example embodiments, the communication method usage information includes frequencies of success for communicating with a contact using each communication method. In such example embodiments, the dynamic communication option module 226 may be configured to log whether communication attempts using each communication method have been successful for each contact. After a communication attempt has been made to a contact 231 using a given communication method, the dynamic communication option module 226 saves data to memory to indicate that the communication attempt was made and to indicate whether the communication was successful. This data may be used to determine the frequency of successful communications to a given contact 231 using each communication method.

Specific methods of determining the frequency of success are discussed above with reference to FIG. 2.

The frequency of success acts as a measure of the likelihood of reaching a contact using a communication method. Accordingly, in at least some example embodiments, the dynamic communication option module 226 determines a frequency of success for each communication method associated with a contact in order to determine the likelihood that any given communication method will be successful in contacting a contact 231.

The frequency of success for each communication method is determined on a per-contact basis. That is, the frequency of success for each communication method may vary between contacts 231. The frequency of success for each communication method is separately tracked for each contact 231.

While frequency of success may be used as communication method usage information in some example embodiments, in other example embodiments, other communication method usage information may be used. For example, in some example embodiments, the communication method usage information may be based on or identify a number of communication attempts for each communication method used for communications with a contact. That is, the communication method usage information may represent a frequency of use of each communication method for contacting a contact 231. A count of the number of communication attempts to a contact using each communication method may be obtained by the dynamic communication options module 226. That is, each time a communication is made to a contact using a communication method, a counter associated with that communication method and that contact 231 may be incremented. In at least some example embodiments, a frequency of use of each communication method for contacting a contact may then be determined.

After communication method usage information is obtained, at 306, the dynamic communication option module 226 ranks communication methods for a contact based on the communication method usage information. In some example embodiments, at 306, the dynamic communication option module 226 ranks each communication method available for a contact based on the frequency of success in reaching that contact using that communication method. That is, in at least some example embodiments, ranking communication methods involves assigning a higher relative rank to communication methods with a higher frequency of success than communication methods with a lower relative frequency of success.

In other example embodiments, the dynamic communication option module 226 ranks each communication method available for a contact based on the frequency of use of that communication method for attempting to contact that contact.

Next, at 308, the dynamic communication option module 226 displays the communication methods in an ordered list in which the respective positions of the displayed communication methods are determined in accordance with the rankings. In at least some example embodiments, higher ranked communication methods are displayed at a position in the ordered list which is higher in the list than communication methods which are of a relatively lower rank.

Contact List Display

Figure 4:
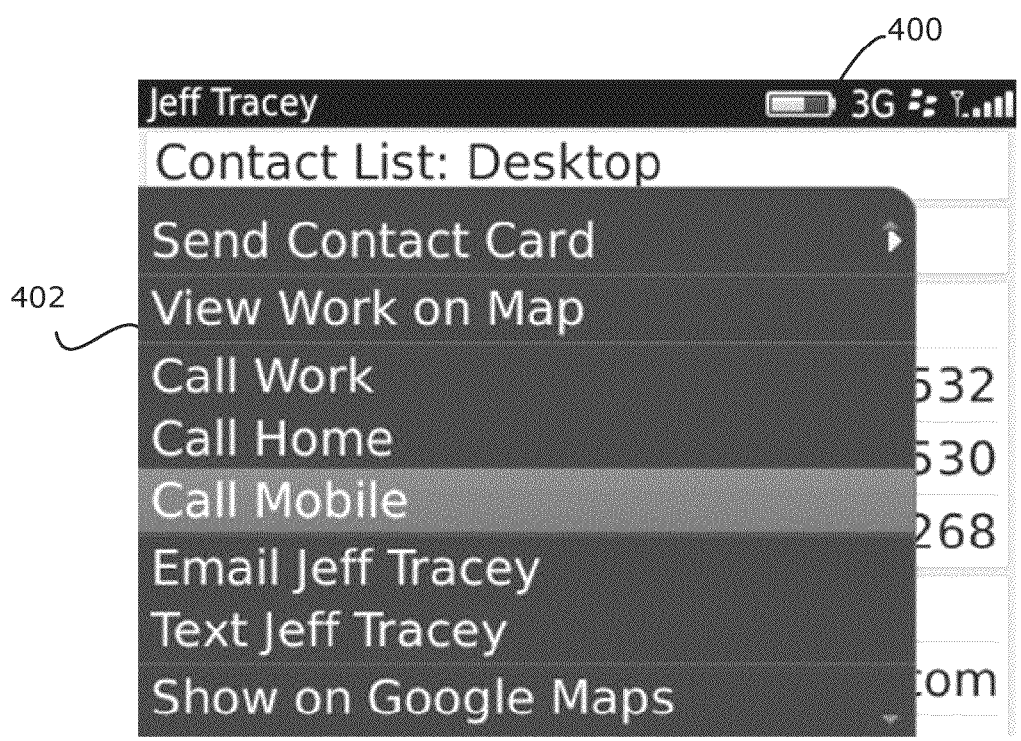
FIG. 4 is a contact list display screen in accordance with example embodiments of the present disclosure.

Referring now to FIG. 4, an example embodiment of a contact list display screen 400 is illustrated. The contact option list screen 400 may be displayed after a contact 231 has been selected in the contact manager 228. The contact list display screen 400 includes an ordered list 402 identifying a number of communication methods available for contacting the contact. In the example illustrated, the ordered list includes options to "Call Work", "Call Home", "Call Mobile", "Email", or "Text." The screen 400 may contain other selectable options in addition to the communication methods (i.e. an option to show an address on a map).

The communication methods displayed in the ordered list 402 are selectable using an input mechanism 260 (FIG. 2) associated with the device 201. For example, in the example embodiment illustrated, "Call Mobile" is selected. Selecting or otherwise activating one of the communication methods, in at least some example embodiments, causes the mobile device 201 to initiate a communication to the selected contact 231 using the selected communication method.

The ordered list 402 is, in at least some example embodiments, the list which is displayed according to methods 300 (FIG. 3), 500 (FIG. 5) for providing dynamic communication options on a communication device 201.

Further Methods of Providing a Ranked List

Figure 5:
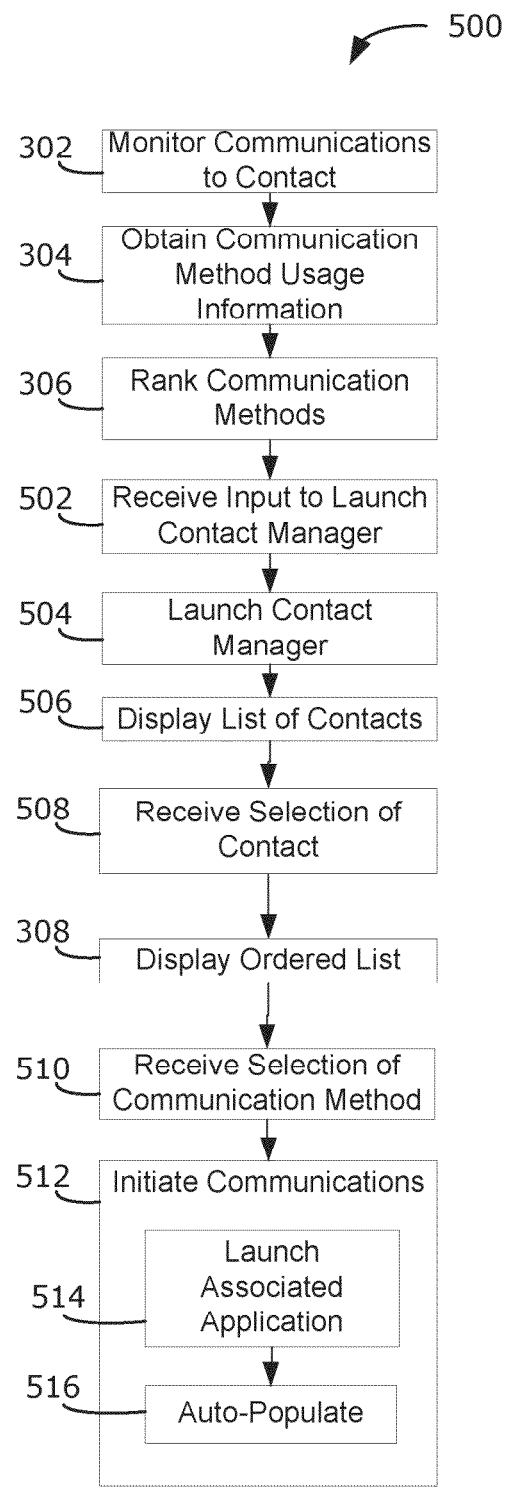
FIG. 5 is a flowchart illustrating a method for providing dynamic communication options on a communication device in accordance with example embodiments of the present disclosure.

Referring now to FIG. 5, a further method 500 for providing dynamic communication options on a communication device 201 is illustrated. One or more application or module stored in memory of the device 201 may be configured to perform the method 500 of FIG. 5. More particularly, one or more application or module may contain computer readable instructions which cause the processor 240 (FIG. 2) of the device 201 to perform the method 500. In at least some example embodiments, a contact manager 228 and/or a dynamic communication option module 226 stored in memory of the device 201 is configured to perform the method 500 of FIG. 5. It will, however, be appreciated that any one or more of the steps of FIG. 5 may be provided by another software application or module; for example, the operating system 222.

The method 500 of FIG. 5 is similar to the method 300 of FIG. 3. However, the method 500 discusses additional features which were not yet discussed with reference to FIG. 3.

As in the example embodiment of FIG. 3, the method 500 includes, at 302, monitoring communications to each contact 231 associated with the device 201 and, at 304, obtaining communication method usage information based on the communication methods used for communications with each contact. The method 500 also includes, at 306, ranking communication methods for a contact based on the communication method usage information for that contact. 302, 304 and 306 are discussed in greater detail above with reference to FIG. 3.

It will be appreciated, that the dynamic communication option module 226 may not immediately display the ordered list on the display. In at least some example embodiments, the dynamic communication option module 226 is only configured to display the ordered list on the display in response to receiving a predetermined input via an input mechanism 260.

Accordingly, at 502, an input is received from an input mechanism 260 (FIG. 2) associated with the device instructing the device 201 to launch the contact manager 228. A user may input the instruction to launch the contact manager 228 by selecting an associated icon or link to the contact manager 228 using a navigational input mechanism. In response, at 504, the contact manager 228 is opened on the device 201.

Next, at 506, the contact manager 228 may display a list of contacts on the display of the device 201. The list of contacts may include all of the contacts 231 associated with the device or may include only those contacts meeting predetermined criteria. It will be appreciated that any of the lists referred to in the present disclosure may be too large to display in a single window or screen. In such example embodiments, suitable scrolling techniques may be employed.

Next, at 508, a selection of one of the contacts 231 is received from an input mechanism 260 associated with the device. After receiving a selection of one of the contacts 231, at 308, the ordered list 402 for the selected contact 231 is be displayed on the display of the device. The ordered list for that contact displays communication methods in a manner in which the respective positions of the communication methods corresponds to the rankings of communication methods for that contact 231. 308 is described in greater detail above with reference to FIG. 3.

In at least some example embodiments, after the ordered list is displayed (at 308), the device 201 may permit a user to select one of the communication methods in the ordered list using an input mechanism 260 associated with the device. In response to receiving such a selection (at 510), the contact manager 228 may, at 512, initiate communications to the contact 231 associated with the ordered list using the selected communication method. In at least some example embodiments, the contact manager 228 may do so by launching an application associated with the communication method (step 514). For example, if the selected communication method is an email communication method, then the contact manager 228 may launch an email application.

In at least some example embodiments, at 516, the contact manager 228 may automatically populate one or more fields associated with a communication with address information for the selected communication method. For example, the contact manager 228 may automatically populate an address field associated with the communication with address information for the selected communication method.

Receiving Communication Preferences from Recipient Device

While FIG. 3 and FIG. 5 illustrate example embodiments in which communications are ranked based on communication method usage information obtained on a sending device 201, in other example embodiments, the communication methods may be ranked on a recipient device associated with a contact. That is, a contact may be permitted to specify communication preferences for that contact, which will affect how the sending device 201 provides communication options for communicating with that contact.

Figure 6:
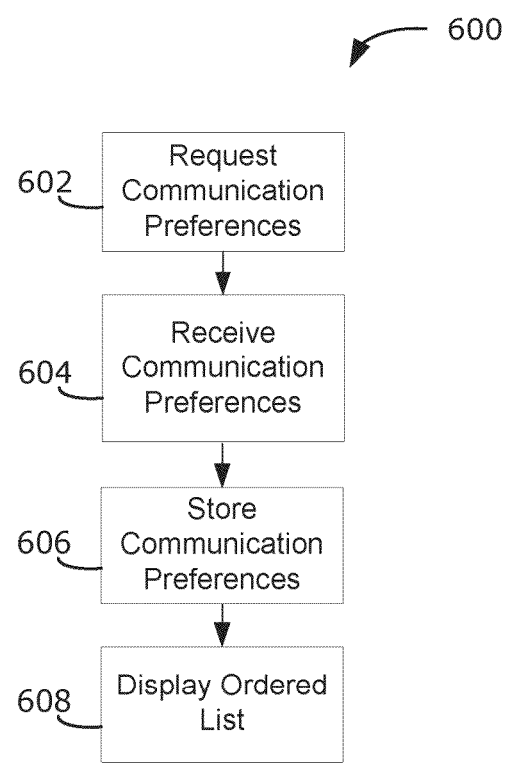
FIG. 6 is a flowchart illustrating a method for providing dynamic communication options on a communication device in accordance with example embodiments of the present disclosure.

Referring now to FIG. 6, a further method 600 for providing dynamic communication options on a communication device 201 is illustrated. One or more application or module stored in memory of the device 201 may be configured to perform the method 600 of FIG. 6. More particularly, one or more application or module may contain computer readable instructions which cause the processor 240 (FIG. 2) of the device 201 to perform the method 600. In at least some example embodiments, a contact manager 228 and/or a dynamic communication option module 226 stored in memory of the device 201 is configured to perform the method 600 of FIG. 6. It will, however, be appreciated that any one or more of the steps of FIG. 6 may be provided by another software application or module; for example, the operating system 222.

First, at 602, the device 201 requests communication preferences for a contact 231 (FIG. 2) from that contact 231 (FIG. 2). In doing so, the device 201 may send an electronic message to the contact 231 requesting that the contact provide communication preferences. More particularly, the device 201 may send an electronic message to the contact using one or more communication methods associated with the contact 231. The electronic message may, in some example embodiments, include computer readable instructions which are executable by an electronic device associated with the contact 231.

When the contact 231 receives the electronic message on a recipient electronic device associated with the contact, the contact selects communication preferences for that contact. The communication preferences are, in at least some example embodiments, selected automatically by the recipient electronic device in accordance with one or more pre-determined rules, which may be defined by the contact. The communication preferences, in at least some example embodiments, rank communication methods for a contact relative to one another.

The rankings of communication methods indicate relative preferences for the communication methods. That is, the rankings indicate the degree to which a communication method is preferred by the contact relative to the other communication methods.

While in some example embodiments, the recipient electronic device automatically selects communication preferences, in other example embodiments, a user of the recipient electronic device may perform the selection by interacting with one or more input mechanisms associated with the recipient electronic device.

The communication preferences are sent by the recipient electronic device to the communication device from which the request was sent at 602.

The communication preferences are received at the device 201 at 604 and are stored in a memory at 606. The communication preferences may be stored in a memory of the device 201, such as the flash memory 244 (FIG. 2) so that the communication preferences may be accessed at a later time. The communication preferences may, for example, be stored in a contact record for the contact 231.

Next, at 608, the dynamic communication option module 226 displays the communication methods in an ordered list in which the respective positions of the displayed communication methods are determined in accordance with the rankings contained in the communication preferences. In at least some example embodiments, higher ranked communication methods are displayed at a position in the ordered list which is higher in the list than communication methods which are of a relatively lower rank.

In will be appreciated that the method 600 of FIG. 6 may include additional steps which are not illustrated in FIG. 6. By way of example, in at least some example embodiments, the dynamic communication option module 226 may not immediately display the ordered list on the display. In at least some example embodiments, the dynamic communication option module 226 is only configured to display the ordered list on the display in response to receiving a predetermined input via an input mechanism 260.

Device with Initiate-Communication-Key

As noted previously, in at least some example embodiments, the device 201 includes a dedicated initiate-communications-key 261. One such example embodiment is illustrated in FIG. 7.

Figure 7:
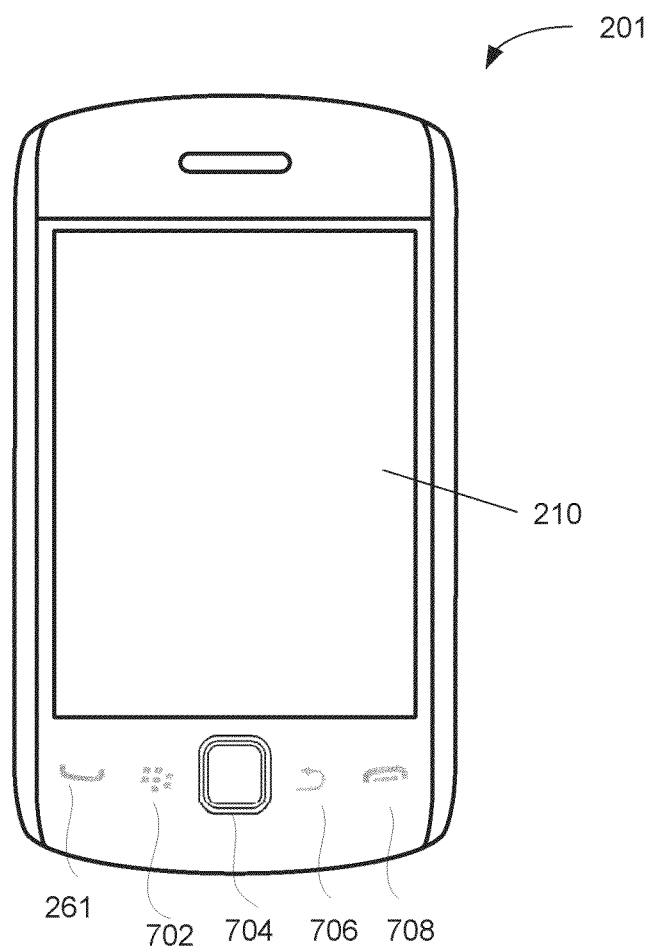
FIG. 7 is a front view of an electronic device with an initiate-communication-key in accordance with example embodiments of the present disclosure.

The device 201 illustrated in FIG. 7 is a touchscreen device which includes a touchscreen display 210. Mounted immediately beneath the display is an initiate-communications-key 261. In the example embodiment of FIG. 7, additional input mechanisms 260 are mounted below the display 210. For example, the device 201 of FIG. 7 includes a menu key 702, a navigational input mechanism 704, a back key 706 and a hang-up key 708.

In at least one mode, the device 201 is configured to initiate a communication using a communication method to a contact 231 when the initiate-communication-key 261 is activated.

As will be described in greater detail below with reference to FIG. 8, the specific communication method which is used when the initiate-communication-key is activated is, in some example embodiments, configurable for each contact.

Configuring Initiate-Communication-Key

Figure 8:
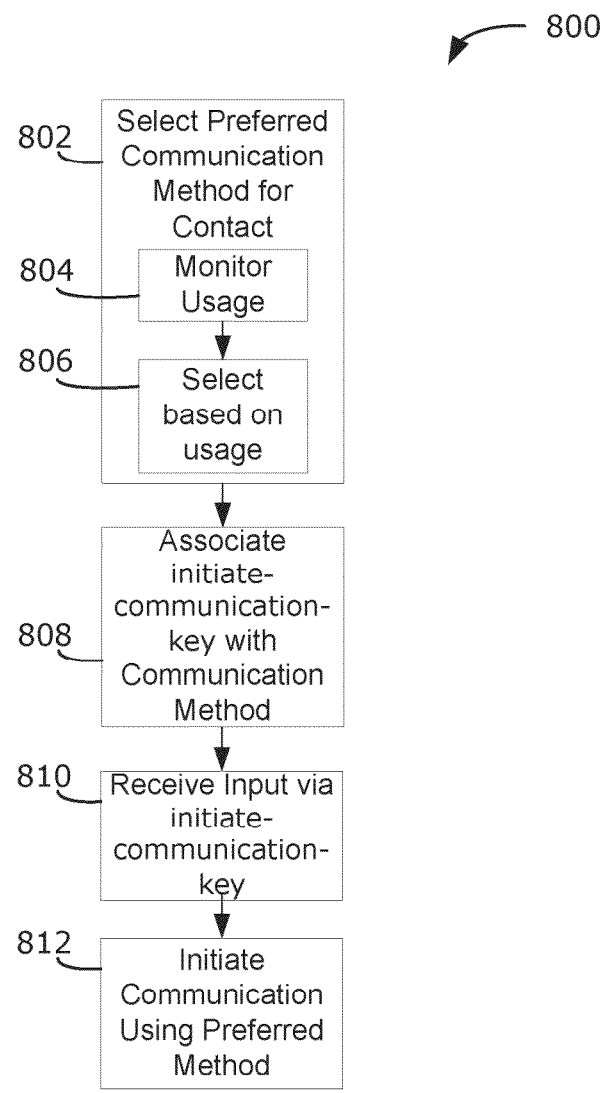
FIG. 8 is a flowchart illustrating a method for configuring an initiate-communication-key in accordance with example embodiments of the present disclosure.

Referring now to FIG. 8, a method 800 of assigning a command to an input mechanism on a communications device 201 is illustrated. More particularly, the method 800 may be used to assign one or more communication methods to an initiate-communication-key 261 associated with the device 201.

One or more application or module stored in memory of the device 201 may be configured to perform the method 800 of FIG. 8. More particularly, one or more application or module may contain computer readable instructions which cause the processor 240 (FIG. 2) of the device 201 to perform the method 800. In at least some example embodiments, a contact manager 228 and/or a dynamic communication option module 226 stored in memory of the device 201 is configured to perform the method 800 of FIG. 8. It will, however, be appreciated that any one or more of the steps of FIG. 8 may be provided by another software application or module; for example, the operating system 222.

In at least some example embodiments, each contact may have its own communication method associated with the initiate-communication-key 261. In such example embodiments, when that contact 231 is selected within a contact manager 228, the initiate-communication-key 261 causes a communication to be initiated to the contact 231 using the communication method associated with the initiate-communication-key.

Accordingly, in at least some example embodiments, at 802, the dynamic communication option module 226 selects one of the communication methods as a preferred communication method for communicating with a selected one of the contacts 231.

In at least some example embodiments, in order to select one of the communication methods as a preferred communication method, the dynamic communication option module 226 monitors (at 804) usage of the communication methods for communicating with the selected contact. The dynamic communication option module 226 may automatically select (at 806) a preferred communication method for communicating with the selected contact based on the usage of the communication methods. For example, in some example embodiments, the dynamic communication option module 226 determines a most frequently used communication method for communicating with the contact and automatically selects that communication method as the preferred communication method for communicating with that contact. In other example embodiments, the dynamic communication option module 226 determines a most frequently successful communication method for communicating with the contact and automatically selects that communication method as the preferred communication method for communicating with that contact.

In other example embodiments (not shown), the preferred communication method for a contact may be selected by way of user input via an input mechanism 260 associated with the device. That is, a user may use an input mechanism 260 to instruct the device 201 to select a specified one of the communication methods as the preferred communication method for communicating with a selected one of the contacts.

Next, at 808, the dynamic communication option module 226 associates the initiate-communication-key 261 with the preferred communication method for the selected contact. That is, for the selected contact, the dynamic communication option module 226 associates the initiate-communication-key 261 with the preferred communication method for that contact.

In this way, after the preferred communication method is selected for a contact, when the initiate-communication-key is activated (i.e. an input is received at the device 201 from the initiate-communication-key 261 at 810) when the contact is selected (i.e. by selecting the contact in the contact manager 228) a communication to that contact will be initiated (at 812) using the preferred communication method for that contact.

In some example embodiments, initiating a communication to that contact is performed by opening an application associated with that communication method. In at least some example embodiments, the contact manager 228 may do so by launching an application associated with the preferred communication method for the selected contact. For example, if the preferred communication method is an email communication method, then the contact manager 228 may open an email application.

In at least some example embodiments, the contact manager 228 may automatically populate one or more fields associated with a communication with address information for the preferred communication method for the contact. For example, the contact manager 228 may automatically populate an address field associated with the communication with address information for the selected communication method.

Configuring Initiate-Communication-Key Based on Contact Preferences

In at least some example embodiments, a contact 231 may be permitted to specify a preferred communication method for use in contacting that contact 231. One such example embodiment is illustrated in FIG. 9.

Figure 9:
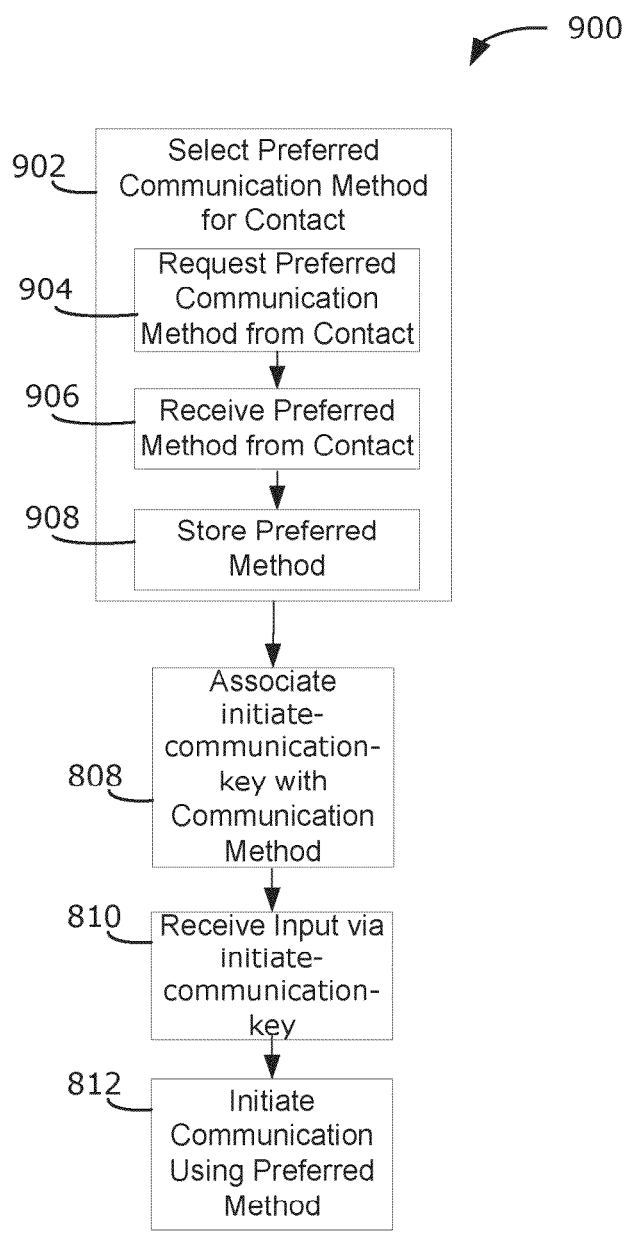
FIG. 9 is a flowchart illustrating a method for configuring an initiate-communication-key in accordance with example embodiments of the present disclosure.

Referring now to FIG. 9, a method 900 of assigning a command to an input mechanism on a communications device 201 is illustrated. More particularly, the method 900 may be used to assign one or more communication methods to an initiate-communication-key 261 associated with the device 201.

One or more application or module stored in memory of the device 201 may be configured to perform the method 900 of FIG. 9. More particularly, one or more application or module may contain computer readable instructions which cause the processor 240 (FIG. 2) of the device 201 to perform the method 900. In at least some example embodiments, a contact manager 228 and/or a dynamic communication option module 226 stored in memory of the device 201 is configured to perform the method 900 of FIG. 9. It will, however, be appreciated that any one or more of the steps of FIG. 9 may be provided by another software application or module; for example, the operating system 222.

The method 900 of FIG. 9 is similar to the method 800 of FIG. 8. However, in the method 900 of FIG. 9, the contact 231 is permitted to select their own preferred communication method.

Accordingly, in at least some example embodiments, at 902, the dynamic communication option module 226 selects one of the communication methods as a preferred communication method for communicating with a selected one of the contacts 231.

In at least some example embodiments, in order to select one of the communication methods as a preferred communication method, the dynamic communication option module 226 requests a preferred communication method from a contact 231 (at 904). In doing so, the device 201 may send an electronic message to the contact 231 requesting that the contact provide a preferred communication method. More particularly, the device 201 may send an electronic message to the contact using one or more communication methods associated with the contact 231. The electronic message may, in some example embodiments, include computer readable instructions which are executable by an electronic device associated with the contact 231.

When the contact 231 receives the electronic message on a recipient electronic device associated with the contact, the contact selects a preferred communication method for that contact. The preferred communication method is, in at least some example embodiments, selected automatically by the recipient electronic device in accordance with one or more pre-determined rules, which may be defined by the contact.

While in some example embodiments, the recipient electronic device automatically selects a preferred communication method, in other example embodiments, a user of the recipient electronic device may perform the selection by interacting with one or more input mechanisms associated with the recipient electronic device.

The preferred communication method is sent by the recipient electronic device to the communication device from which the request was sent at 904.

The preferred communication method is received at the device 201 at 906 and is stored in a memory at 908. The preferred communication method may be stored in a memory of the device 201, such as the flash memory 244 (FIG. 2) so that the preferred communication method may be accessed at a later time. The preferred communication method may, for example, be stored in a contact record for the contact 231.

After the preferred communication method is selected, at 808, the dynamic communication option module 226 associates the initiate-communication-key 261 with the preferred communication method for the selected contact. That is, for the selected contact, the dynamic communication option module 226 associates the initiate-communication-key 261 with the preferred communication method for that contact.

In this way, after the preferred communication method is selected for a contact, when the initiate-communication-key is activated (i.e. an input is received at the device 201 from the initiate-communication-key 261 at 810) when the contact is selected (i.e. by selecting the contact in the contact manager 228) a communication to that contact will be initiated (at 812) using the preferred communication method for that contact. 808, 810 and 812 are discussed in greater detail above with reference to FIG. 8. In accordance with further example embodiments of the present disclosure, there is provided apparatus such as a data processing system (e.g. computer and/or server) for implementing the methods described herein, a computer program product including a computer readable medium having stored thereon computer program instructions for implementing the methods described herein on a suitable data processing system, as well as a computer data signal having program instructions recorded therein for practising the methods of the present disclosure on a suitable data processing system.

In accordance with further example embodiments of the present disclosure, there is provided a non-transitory computer readable storage medium having stored thereon computer executable instructions including instructions for practising the methods of the present disclosure. The computer executable instructions are configured to cause one or more processors to perform the methods described herein.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

FIGS. 3, 5, 6, 8 and 9 are flowcharts illustrating example embodiment methods (also referred to herein as processes). Some of the steps illustrated in the flowcharts may be performed in an order other than that which is described. Also, it should be appreciated that not all of the steps described in the flow charts are required to be performed, that additional steps may be added, and that some of the illustrated steps may be substituted with other steps.

The example embodiments of the present disclosure described above are intended to be examples only. Those of skill in the art may effect alterations, modifications and variations to the particular embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method for providing dynamic communication options on a communications device, the communications device is configured to provide communication services using communication methods, including a message-based communication method, the method comprising:
monitoring communications with a contact associated with the communications device;
obtaining communication method usage information based on the communication methods used for the communications with the contact, including determining a frequency of success of communicating with the contact using the message-based communication method by determining whether a message-based reply to a communication sent using the message-based communication method is received;
ranking the communication methods for the contact based on the communication method usage information including the frequency of success of communicating with the contact using the message-based communication method; and
displaying at least two of the communication methods in an ordered list, wherein respective positions of the displayed communication methods in the ordered list are determined in accordance with the rankings.

2. The method of claim 1, wherein ranking the communication methods comprises assigning a higher relative rank to the communication methods with a higher frequency of success than the communication methods with a lower relative frequency of success.

3. The method of claim 1, wherein one of the communication methods uses a voice based communication technology and wherein obtaining the communication method usage information further comprises determining a frequency of success of the voice based communications for the contact based on a number of voice calls to the contact which have been completed.

4. The method of claim 1, wherein the message-based reply is a read receipt or delivery receipt.

5. The method of claim 1, further comprising, prior to displaying:
opening a contact manager;
displaying a list of the contacts which includes the contact for which the communication methods have been ranked; and
receiving a selection of the contact for which the communication methods have been ranked.

6. The method of claim 1, wherein the communication methods include at least two of:
voice communications, email messaging, Short Message Service messaging, multimedia message service messaging, social network based messaging, device-to-device based messaging, instant messaging.

7. The method of claim 1, wherein the ordered list includes at least three communication methods and wherein the respective positions of the displayed communications methods are each determined in accordance with the rankings.

8. The method of claim 7, wherein the communications device is configured to provide communications services to the contact using at least three of the communication methods and wherein ranking communication methods comprises determining a first highest ranked communication method, a second highest ranked communication method and a third highest ranked communication method, and wherein displaying the communications methods in the ordered list comprises:
displaying the first highest ranked communication method in a higher relative position than the second highest ranked communication method; and
displaying the second highest ranked communication method is a higher relative position than the third highest ranked communication method.

9. The method of claim 1, wherein monitoring the communications with the contact comprises: obtaining a count of the obtained number of communication attempts to a contact using each communication method and wherein the communication method usage information is based on the number of communication attempts for each communication method used for the communications with the contact.

10. The method of claim 1, further comprising:
receiving, via an input mechanism, a selection of one of the communication methods and, in response, initiating communications to the contact using the selected one of the communication methods.

11. The method of claim 1, wherein at least some of the communication methods are defined by specified address information and a communication technology compatible with the specified address information.

12. An electronic device comprising:
a communication subsystem for sending communications using a communication methods, including a message-based communication method;
a processor;
a display; and
a memory having stored thereon computer readable instructions for causing the processor to:
monitor communications with a contact associated with the electronic device;
obtain communication method usage information based on the communication methods used for the communications with the contact, including determining a frequency of success of communicating with the contact using the message-based communication method by determining whether a message-based reply to a communication sent using the message-based communication method is received;

rank the communication methods for the contact based on the communication method usage information including the frequency of success of communicating with the contact using the message-based communication method; and display at least two of the communication methods in an ordered list, wherein respective positions of the displayed communication methods in the ordered list are determined in accordance with the rankings.

13. The electronic device of claim 12, wherein ranking communication methods comprises assigning a higher relative rank to communication methods with a higher frequency of success than communication methods with a lower relative frequency of success.

14. The electronic device of claim 12, wherein one of the communication methods uses a voice based communication technology and wherein obtaining the communication method usage information further comprises determining a frequency of success of voice based communications for the contact based on a number of voice calls to the contact which have been completed.

15. The electronic device of claim 12, wherein the message-based reply is a read receipt or delivery receipt.

\* \* \* \* \*